United States Patent [19]

Hertema

[11] Patent Number: 5,480,024

[45] Date of Patent: Jan. 2, 1996

[54] COMPUTER DISKETTE RETAINER FOR FILE FOLDERS

[76] Inventor: Daryl Hertema, 199 W. Pine River Rd., Midland, Mich. 48640

[21] Appl. No.: 276,245

[22] Filed: Jul. 18, 1994

Related U.S. Application Data

[63] Continuation-in-part of Ser. No. 43,355, Apr. 6, 1993, abandoned.

[51] Int. Cl.⁶ .................................................. B65D 85/57
[52] U.S. Cl. ...................................... 206/232; 206/308.3
[58] Field of Search .................................. 206/232, 307, 206/309–313, 387, 444; 229/1.5, 68 R, 71; 383/7

[56] References Cited

U.S. PATENT DOCUMENTS

| 916,503 | 3/1909 | Thompson | 229/68 R |
|---|---|---|---|
| 2,473,333 | 6/1949 | Geis et al. | 229/68 R |
| 2,874,699 | 2/1959 | Dunleavy . | |
| 3,217,971 | 11/1965 | Shvetz . | |
| 3,522,908 | 8/1970 | Carrigan | 229/71 |
| 3,830,422 | 8/1974 | Dunn | 229/71 |
| 3,873,735 | 3/1975 | Chalin et al. . | |
| 4,485,962 | 12/1984 | Farley . | |
| 4,589,544 | 5/1986 | Schweinsberg . | |
| 4,709,400 | 11/1987 | Bruno . | |
| 4,937,410 | 6/1990 | Anderson . | |
| 4,971,195 | 11/1990 | Mitsuyama . | |
| 4,978,005 | 12/1990 | Sammet | 206/444 |
| 5,160,296 | 11/1992 | Katz . | |
| 5,224,599 | 7/1993 | Uchida . | |

FOREIGN PATENT DOCUMENTS

| 263621 | 7/1968 | Austria . | |
|---|---|---|---|
| 0708832 | 5/1965 | Canada | 229/68 R |
| 0519896 | 12/1992 | European Pat. Off. . | |
| 3162282 | 7/1991 | Japan . | |
| 1225408 | 3/1971 | United Kingdom | 206/312 |

Primary Examiner—Jimmy G. Foster
Attorney, Agent, or Firm—Greer, Burns & Crain, Ltd.

[57] ABSTRACT

A computer diskette retainer is provided for accommodating and storing at least one computer diskette and being attachable to an upper edge of a file folder to be adjacent the upper edge as the folder is disposed in a file drawer. The retainer includes a pocket portion having a rear wall, a front wall, a pair of side walls and a bottom wall, the side walls and the bottom wall securing the front wall to the rear wall and maintaining the front wall in spaced relationship from the rear wall to define a pocket with an open upper end. An attachment portion is formed by an extension of the rear wall and has at least one laterally extending tongue for engaging the file folder. Each tongue has a base integral with the attachment portion, a free end disposed proximate to a corresponding one of the side walls so that the attachment portion provides sufficient support to the pocket portion. Upon engagement of the at least one tongue with the file folder, the pocket portion is suspended from the upper edge of the file folder and accommodates the at least one diskette therein.

14 Claims, 4 Drawing Sheets

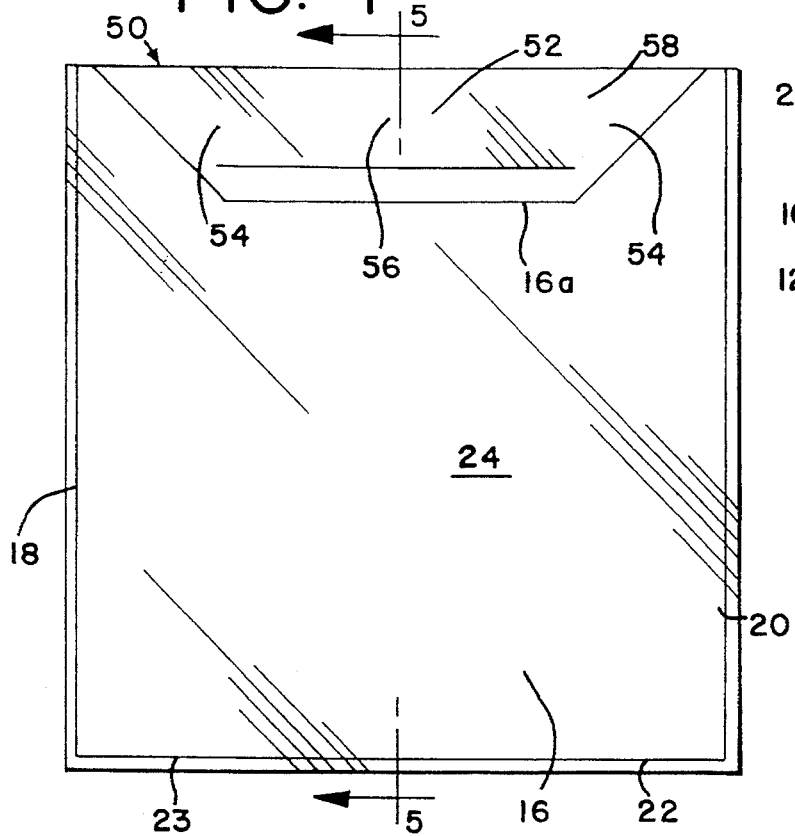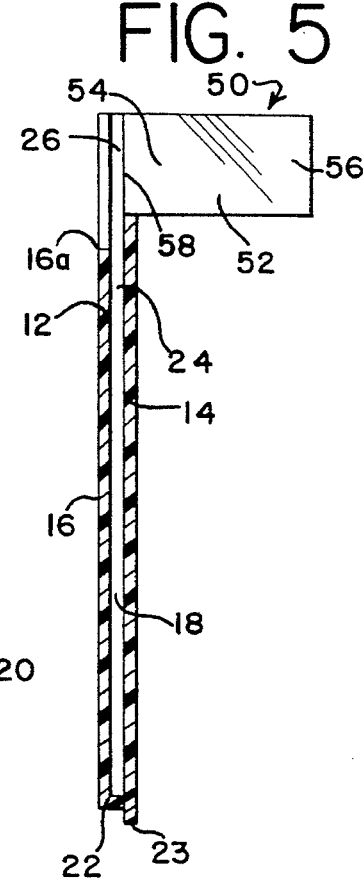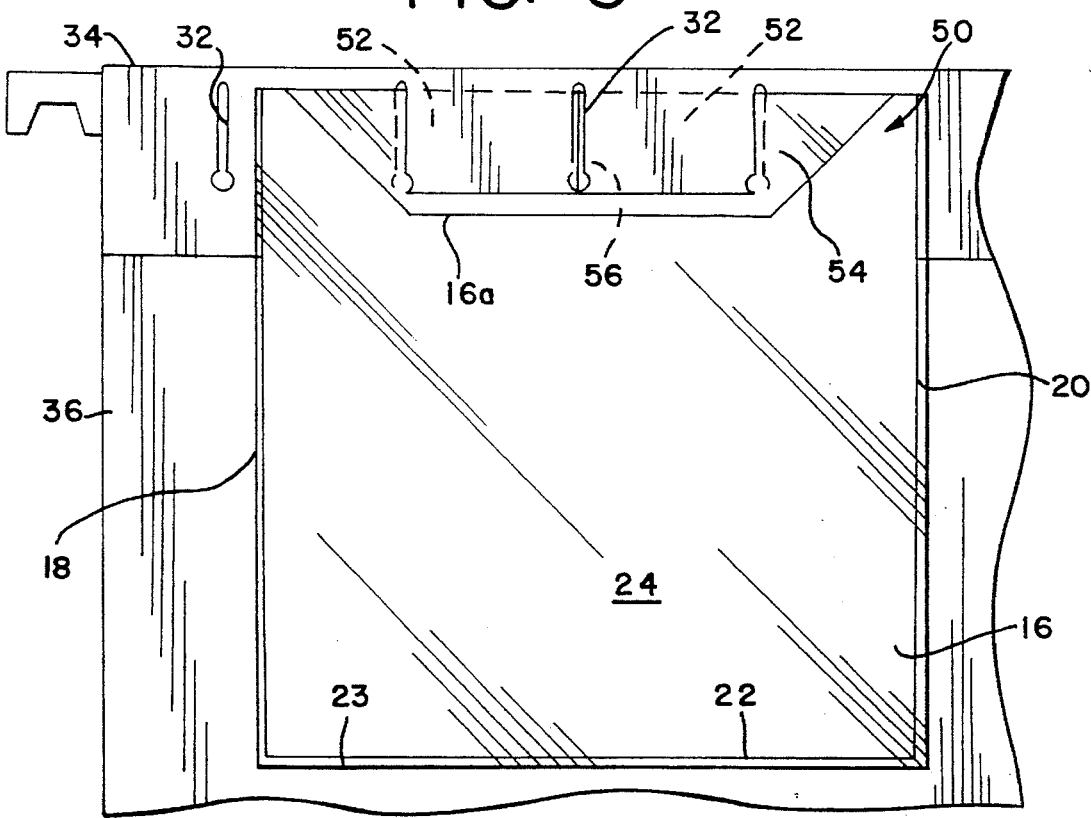

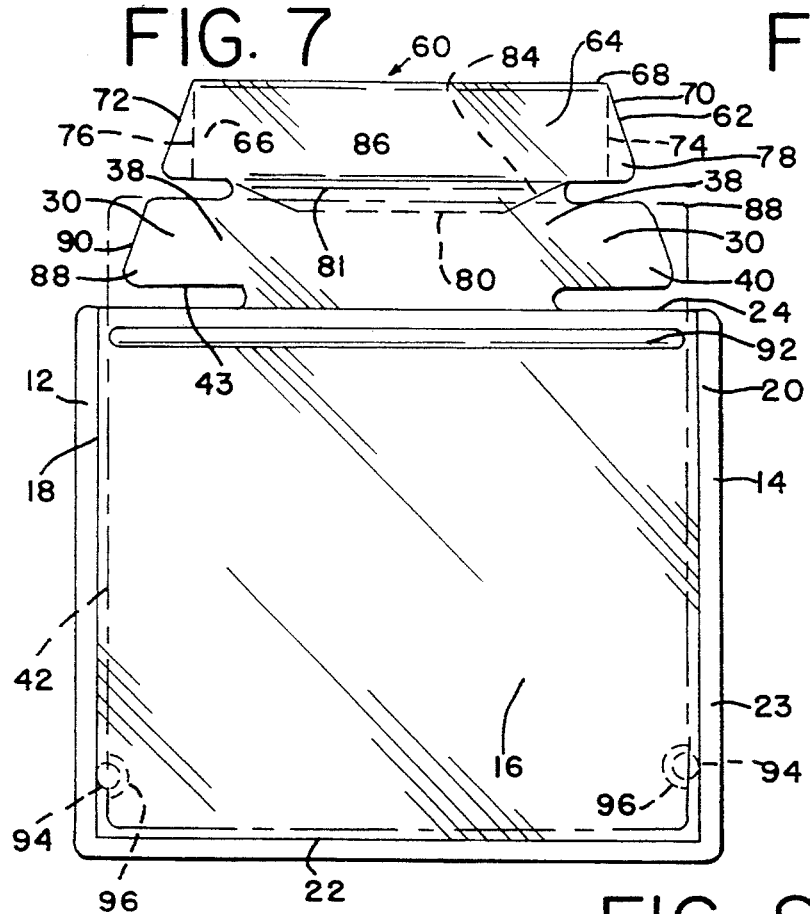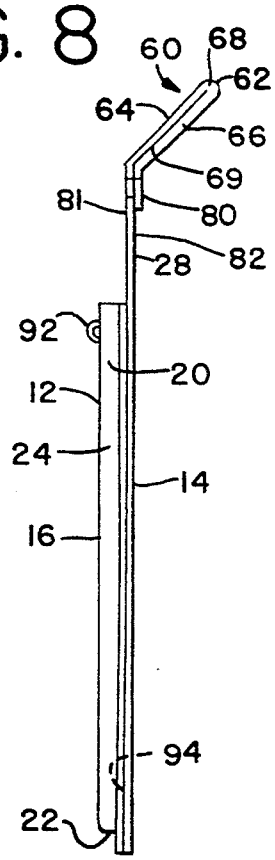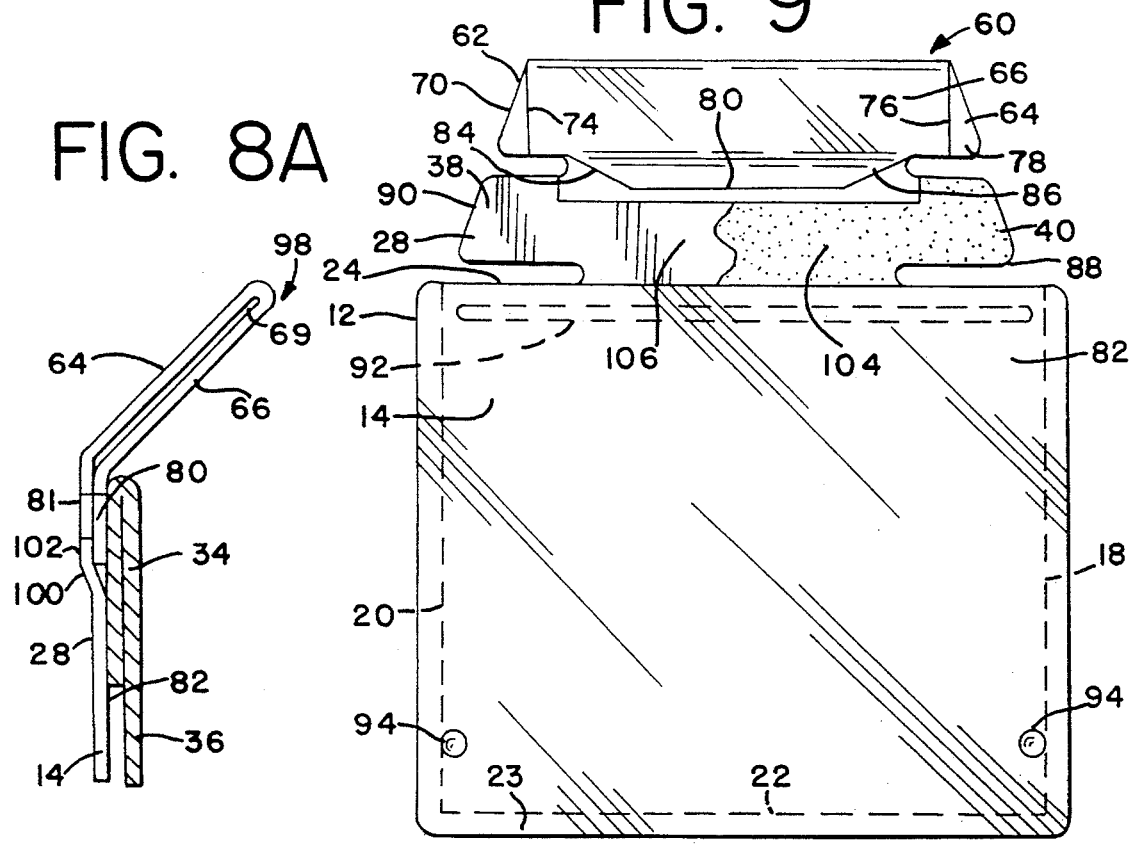

COMPUTER DISKETTE RETAINER FOR FILE FOLDERS

RELATED APPLICATION

This application is a continuation in part of U.S. patent application Ser. No. 08/043,355, filed Apr. 6, 1993, abandoned.

BACKGROUND OF THE INVENTION

The present invention relates to a one piece diskette case capable of being affixed to a conventional file folder. More particularly, this invention relates to a computer diskette retainer suitable for engagement on a conventional file folder and capable of securely holding and protecting computer diskettes stored therein.

In the past, diskette storage has been addressed by conventional devices, such as trays, library cases, plastic looseleaf protectors held in metal ring binders, rotary files, cases which can be stored in desks, and the like. Unfortunately, software users have discovered drawbacks to most of these devices.

In the case of trays, although they are convenient to use and offer protection from dust, etc. when covered, if they are accidently overturned, the tray may break and the diskettes scatter, exposing them to harmful external objects and conditions. Further, such trays can be inconvenient to use if the diskettes must be transported, since they rarely have locks and are usually cumbersome to carry. Library cases address the problem of transportation, but snap open, possibly spilling the contents, and can be broken when dropped. Diskette storage trays also take up a considerable amount of storage.

Plastic looseleaf protectors are prone to tearing with constant use, and may expose the diskettes to the metal rings if the diskettes are handled carelessly. These looseleaf protectors also present storage problems when held in conventional binders due to the width of the binders. Rotary diskette files also present storage and transportation problems, since they take up considerable space and are difficult to carry. Also if dropped, the diskettes may scatter, again exposing them to external objects and detrimental conditions.

Cases which may be stored in a desk drawer solve some storage problems, but are cumbersome to carry and are uncovered, exposing them to a potentially harmful environment if dropped or tipped over. Additionally, many of the conventional diskette storage devices are produced through multiple steps and therefore are more expensive to manufacture than the present invention.

Another conventionally available diskette storage device consists of an outer case member made of soft synthetic resin and having an opening at its upper end, and an inner case member which is fitted in the outer case member. The inner case member is made of soft material such as non-woven fabric, paper, cloth, or the like in order to protect a diskette stored therein from damage. In such diskette case, a label is received and held in a space formed between the outer case member and inner case member, and the data diskette is received and held in the inner case member.

However, the above-identified conventional diskette case has the disadvantage of not securely retaining the diskette, for the inner case member may become separated from the outer case member, and also may cause difficulty in retaining and/or replacing the label.

There is also a need for a system wherein computerized data in diskette format is stored in files with corresponding written records. Such storage facilitates both use of the data, and also the periodic purging of same as needed.

In view of the above, one object of the present invention is to provide a computer diskette retainer for file folders which is capable of receiving and storing at least one computer data diskette in association with a corresponding commercially available file folder.

It is a further object of the present invention to provide a computer diskette retainer having structure for releasably securing the retainer to a commercially available file folder.

It is still another object of the present invention to provide a computer diskette retainer for a commercially available file folder which has a label holder for releasably retaining file oriented, identifying labels.

SUMMARY OF THE INVENTION

The above-listed objects are met or exceeded by the present computer diskette retainer for file folders, wherein a pocket dimensioned for releasably accommodating a diskette is provided with formations for attaching and suspending the pocket from one edge of a file folder. In addition, the present retainer may be provided with a label retention portion so that the same product may be used to both identify the file and to retain a diskette. In addition, the retainer may be provided with locking formations for securing the diskette in the pocket and preventing unwanted diskette release. The retainer may be secured to the folder in one of two ways. In the case of hanging folders, by insertion of integral tongues into corresponding slots in the file folder, or, in the case of ordinary folders, by merely attaching the retainer to the file by use of adhesive.

More specifically, a computer diskette retainer is provided for accommodating and storing at least one computer diskette and being attachable to an upper edge of a file folder to be adjacent the upper edge as the folder is disposed in a file drawer. The retainer includes a pocket portion having a rear wall, a front wall, a pair of side walls and a bottom wall, the side walls and the bottom wall securing the front wall to the rear wall and maintaining the front wall in spaced relationship from the rear wall to define a pocket with an open upper end. An attachment portion is formed by an extension of the rear wall and has at least one laterally extending tongue for engaging the file folder.

Each tongue has a base integral with the attachment portion, a free end disposed proximate to a corresponding one of the side walls so that the attachment portion provides sufficient support to the pocket portion. Upon engagement of the at least one tongue with the file folder, the pocket portion is suspended from the upper edge of the file folder and accommodates the at least one diskette therein.

In another embodiment, a combination file folder and computer diskette retainer for accommodating and storing at least one computer diskette with file contents includes a file folder having a pair of elongate upper edges, and a computer diskette retainer including a pocket portion having a rear wall, a front wall, a pair of side walls and a bottom wall. The side walls and the bottom wall securing the front wall to the rear wall and maintaining the front wall in spaced relationship from the rear wall to define a pocket with an open upper end. An attachment portion is formed by an extension of the rear wall and has at least one laterally extending tongue for engaging the file folder.

Each tongue has a base integral with the attachment portion, a free end disposed proximate to a corresponding one of the side walls, and the attachment portion providing sufficient support to the pocket portion so that upon engagement of the at least one tongue with the file folder, the pocket portion is suspended from the upper edge of the file folder and accommodates at least one diskette therein.

BRIEF DESCRIPTION OF THE DRAWINGS

FIG. 4 is a front elevational view of an alternate embodiment of the diskette retainer of FIG. 1;

FIG. 5 is a sectional view taken along the line 5—5 of FIG. 4 and in the direction generally indicated;

FIG. 6 is a front elevational view of the diskette retainer of FIG. 4 shown engaged on a hanging folder;

FIG. 7 is a front elevational view of another alternate embodiment of the present diskette retainer;

FIG. 8 is a side elevational view of the diskette retainer of FIG. 7;

FIG. 8A is a fragmentary side elevational view of an alternate embodiment of the diskette retainer depicted in FIG. 8;

FIG. 9 is a rear elevational view of an alternate embodiment of the diskette retainer depicted in FIG. 7;

DESCRIPTION OF THE PREFERRED EMBODIMENT

Figure 1:
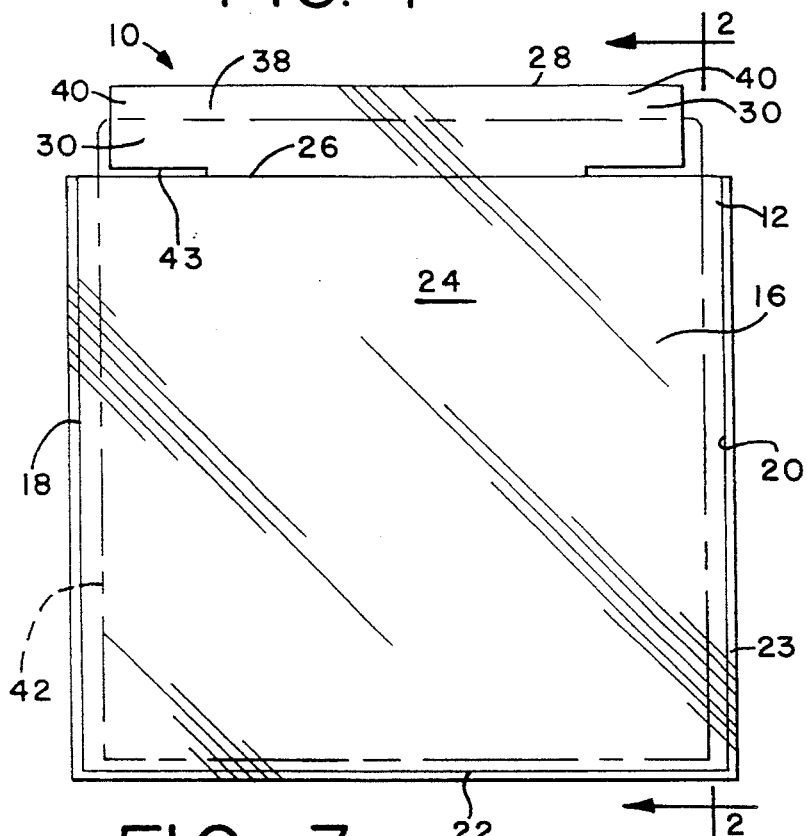
FIG. 1 is a front elevational view of the present computer diskette retainer apparatus having mounting tongues extending outward.
Figure 2:
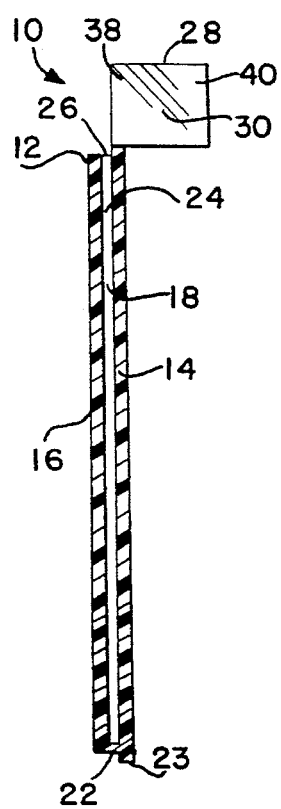
FIG. 2 is a sectional view taken along the line 2—2 of FIG. 1 and in the direction indicated generally.
Figure 3:
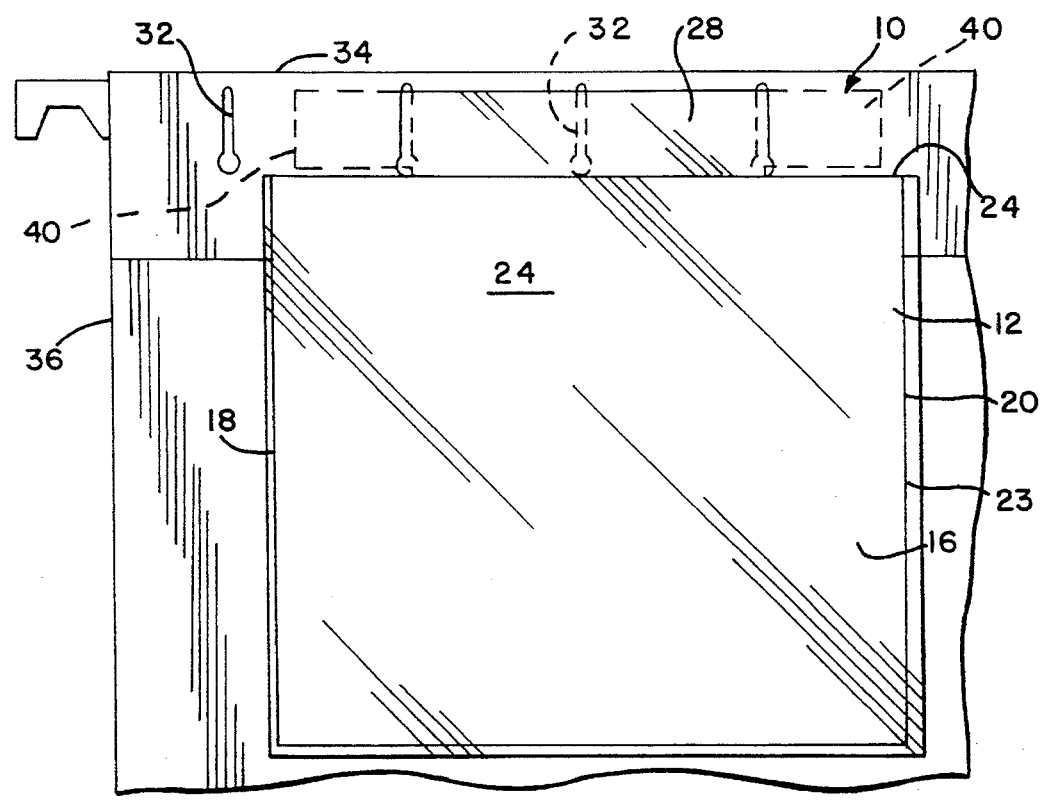
FIG. 3 is a front elevational view of the diskette retainer of FIG. 1 shown engaged on a hanging file folder.

Referring now to FIGS. 1–3, a computer diskette retainer is generally designated 10, and may be cut, pressed or molded from a sheet of resilient, flexible yet self-supporting material such as polyethylene, polypropylene, polyvinylchloride 10 or the like. It is preferred that a transparent or at least translucent material be used to produce the diskette retainer 10 for facilitating visibility of retained diskettes. The retainer 10 includes a pocket portion 12 having a rear wall 14, a front wall 16, a pair of side walls 18, 20, and a bottom wall 22. In the preferred embodiment, the front wall, 16, the side walls 18, 20 and the bottom wall 22 are formed of a single piece which is secured to the rear wall 14 by chemical adhesive, ultrasonic welding, radio frequency welding or other acceptable adhesive technologies. In such cases, a peripheral lip 23 is formed from the rear wall 14. The side walls 18, 20 and the bottom wall 22 maintain the front wall 16 in spaced relationship from the rear wall 14 to define a pocket 24 having an upper open end 26.

An attachment portion 28 is formed by an extension of the rear wall 14 and has at least one laterally extending tongue 30 for engaging a corresponding slot 32 located along an upper edge 34 of a conventional hanging-type file folder 36 (best seen in FIG. 3). In the preferred embodiment, a pair of laterally diverging tongues 30 are provided, and the hanging folder has a plurality of linearly-spaced, generally vertically positioned slots 32. The tongue 30 is shown bent back in FIG. 2 for purposes of clarity, but is coplanar with the rear wall 14. A suitable type of hanging folder is described in U.S. Pat. No. 2,874,699.

Each tongue 30 has a base 38 integral with the attachment portion 28, and a free end 40 disposed proximate to a corresponding one of the side walls 18, 20. The attachment portion 28 provides sufficient support to the pocket portion 12 so that, upon insertion of the tongues 30 in the corresponding slots 32 in the file folder 36, the pocket portion is suspended from the upper edge 34 of the file folder 36 and accommodates at least one computer diskette 42 therein. Each tongue 30 includes a lower edge 43 in generally spaced, parallel relationship to an upper edge of said rear wall.

Although the present retainer 10 is depicted being used with the relatively stiff 3.5 inch diskettes, it is also contemplated that the retainer 10 may also be used with the larger, relatively more flexible 5.25 inch diskettes. It is preferred that the pocket 24 be of sufficient depth that the diskette 42 is substantially retained therein, with a portion of the diskette extending above a top edge of the front wall 16 (best seen in FIG. 1).

Referring now to FIGS. 4–6, an alternate embodiment of the diskette retainer is generally designated 50. The retainer 50 is similar in many structural respects to the retainer 10, and corresponding features have been designated with identical reference numbers. The main difference between the retainers 10 and 50 is that the retainer 50 has tongues 52 which have base portions 54 which are located closer to corresponding side walls 18, 20 than are the tongue free ends 56. In FIG. 5, the tongue 52 is shown bent back for purposes of clarity, but is actually flush with the rear wall 14. Accordingly, the tongues 52 are centrally located within the attachment portion 58. The retainer 50 is engaged to a corresponding upper edge 34 of a hanging folder 36 by insertion of the tongue free ends 56 into corresponding slots 32 in the folder 36. Another different feature of the retainer 50 is that the attachment portion 58 is attached to the rear wall 14, flush with the upper open end 26 of the retainer 50. Further, the front wall 16 has a cutout upper edge 16a which facilitates insertion of diskettes 42.

Referring now to FIGS. 7 and 8, another alternate embodiment of the diskette retainer 10 is generally designated 60. The retainer 60 includes many of the features of the diskette retainer 10, and identical components have been designated with identical reference numbers. A principal difference between the retainers 60 and 10 is that the retainer 60 includes a label retainer 62 which is preferably made an integral part of the attachment portion 28 of the rear wall 14.

The label retainer 62 includes a front panel 64 and a rear panel 66, each being joined along a common upper edge 68 to define a label retention area 69 therebetween. In the preferred embodiment, the front and rear panels 64, 66 are angled backward in the general range of 45 degrees from the horizontal to facilitate reading of file labels from above once the file is placed in the drawer. The front panel 64 has side edges 70, 72 which are inclined upwardly to define a tab formation which projects laterally beyond a corresponding side edge 74, 76 of the rear panel, thus defining an underlap generally designated 78. The underlap 78 is created to facilitate inserting labels from the side.

A lower edge 80 of the rear panel 66 is formed into a generally vertically projecting lip or underlap which contacts a rear surface 82 of the rear wall 14. In the preferred embodiment, the edge 80 is angled relative to the rear panel 66 and has tapered side margins 84, 86 which facilitate removal of labels. A lower edge 81 of the front panel 64 is integrally formed with the attachment portion 28.

It is preferred that the label retainer 62 be formed of a single sheet of thermoformable plastic material which is bent back upon itself. With the front and rear panels 64, 66 formed in folded relationship, there is an inherent compressive force exerted by the front panel against the rear panel, which facilitates retention of the label.

Another feature of the diskette retainer 60 is that the tongues 30 have rounded corners 88 and inclined side edges 90 to facilitate insertion into the file slots 32. In addition, the label retainer 62 is located in relatively spaced, generally parallel relationship to the tongues 30 and the attachment portion 28. Upon engagement of the tongues 30 into the corresponding slots 32, additional compressive force is exerted on the label retainer 62 to force the front panel 64 against the rear panel 66 with the label sandwiched between them (see FIG. 11G).

Yet another feature of the diskette retainer 60 is that a stiffening bead 92 is disposed near the top edge of the front wall 16 to prevent any warpage of the walls. It is also contemplated that a stiffening bead 92 may be formed on the rear wall 14. Such warpage may cause the front and rear walls to sag or buckle into each other, thus partially blocking entry to the pocket 24 and making it more difficult to insert the diskette 42. The stiffening bead 92 prevents such warpage and helps to maintain the separation between the front and rear walls 16, 14.

To prevent the diskette 42 from easily falling out of the pocket 24 when the file is inverted, the diskette retainer 60 is provided with at least one detent 94 on at least one of the inside surfaces of the rear and front walls 14, 16. The detents 94 are preferably conically shaped, releasably lock the diskette in the pocket 24, and are preferably provided in laterally spaced pairs. Also, the detents 94 are disposed towards the lower end of the pocket 24 near the bottom wall 22. This location of the detents is desired so that corresponding recesses or depressions 96 (shown in phantom) on the diskette may be engaged. Engagement of the detents 94 in the recesses 96 prevents unwanted vertical movement of the diskette from the pocket. In the preferred embodiment, the detents 94 are located on the inside surface of the front wall 16, however additional detents may also be located on the rear wall 14, so that diskettes may be inserted in reversed orientation and still engage the detents.

Referring now to FIG. 8A, an alternate embodiment of the label retainer 62 is generally designated 98. The label retainer 98 differs from the retainer 62 in that the upper portion 100 of the attachment portion 28 is provided with a forward extending formation 102 forming a recess or depression which accommodates the lower edge 80 of the rear panel 66. Thus, rear surfaces of the attachment portion 28 and the lower edge 80 of the rear panel 66 are substantially flush against the opposing surface of the file folder 36. This flush relationship may in some cases reduce excessive pressure exerted by the front panel 64 against the rear panel 66 which holds the label in the label retainer 62.

Referring now to FIG. 9, the present diskette retainers 10, 50 and 60, instead of being inserted in hanging type file folders, may be used with standard "manila" file folders which do not have slotted upper margins. In such cases, a layer of adhesive 104 is applied to the rear surface 82 of the rear wall 14 at the attachment portion 28. The adhesive may either be of the permanent or removable type, and is preferably provided with a protective layer of peel-off paper 106. Accordingly, when provided with adhesive, the present diskette retainer may be applied to a wide variety of file folders. Also, when adhesive is used to secure the retainer 60 to the folder, upon attachment of the retainer, a compressive force is exerted by the front panel 64 against the rear panel 66. Further, the structure of the label retainer shown in FIG. 8A is particularly useful when removable adhesive is used to secure the retainer to the folder. The recess or depression formed by the formation 102 also facilitates the application of adhesive during manufacture by preventing adhesive from being applied in the depression.

Figure 10:
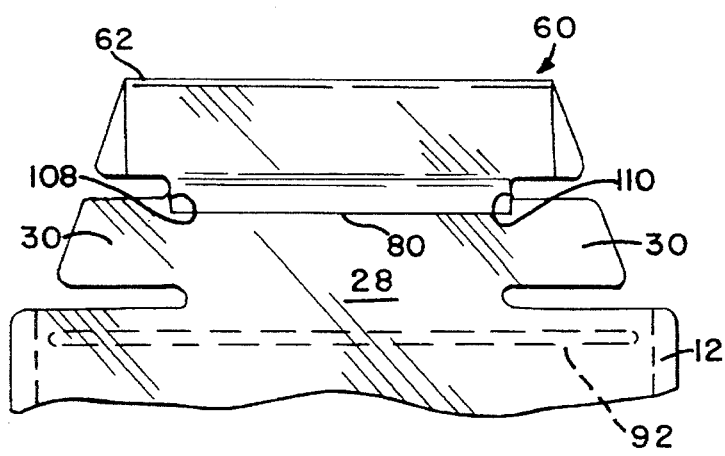
FIG. 10 is a fragmentary elevational view of another alternate embodiment of the diskette retainer depicted in FIG. 7.

Referring now to FIG. 10, it will be seen that the lip formed by the lower edge 80 may alternatively have edge margins 108, 110 which are truncated or rectangular. It is contemplated that the specific configuration of the edge margins may vary with the application.

Figure 11A:
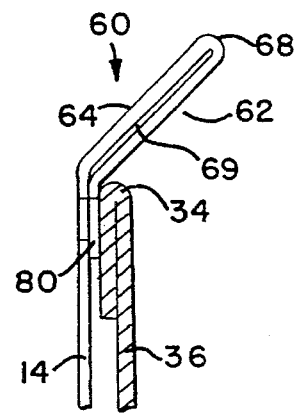
FIGS. 11A–G are a diagrammatic sequential representation of the operation of removing a label from the diskette retainer of FIGS. 7, 9 and 10.
Figure 11B:
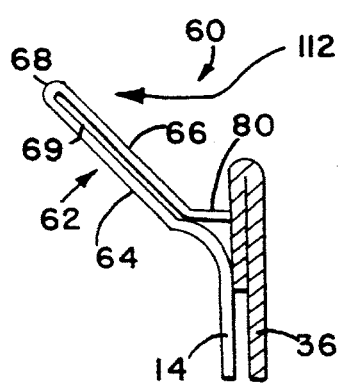
Figure 11C:
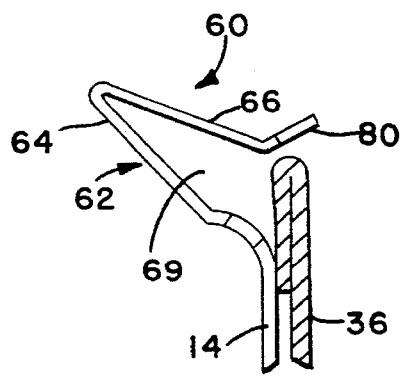
Figure 11D:
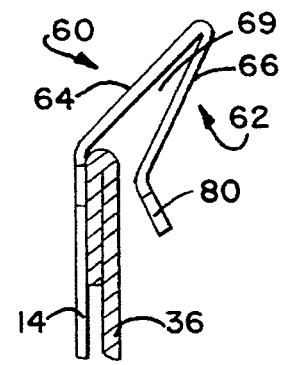
Figure 11E:
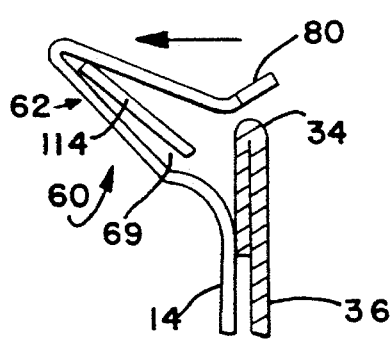
Figure 11F:
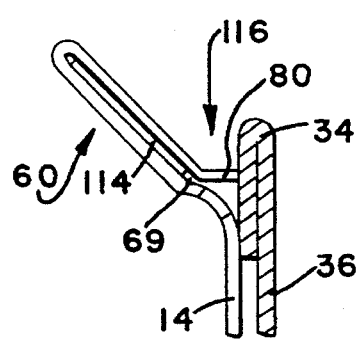
Figure 11G:
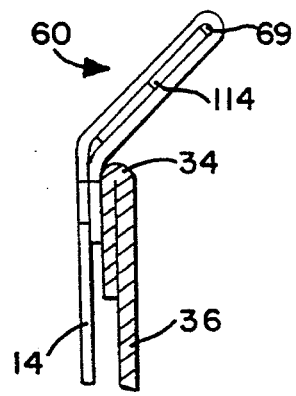

Referring now to FIGS. 11A–G, the sequence of inserting and removing a label in the label retainer 62 is depicted in diagrammatic form. In FIG. 11A, the diskette retainer 60 is shown mounted on a folder 36 and the label retainer does not yet have a label therein. The process begins at FIG. 11B, wherein the user pulls the label retainer 62 forward in the direction of the arrow 112, thus releasing the lower edge or underlap 80 from its position sandwiched between the front panel 64 and the file folder 36. Once released, as seen in FIG. 11C, the inherent compressive force of the front panel 64 against the rear panel 66 is released, allowing the rear panel to pop up, exposing the label retention area 69.

Referring now to FIG. 11D, the rear panel 66 and the lower edge 80 may be placed by the user behind the corresponding flap of the file folder 36 to facilitate the insertion of a label 114 (best seen in FIG. 11E). Referring now to FIG. 11E, once the label 114 is inserted into the label retention area 69, the rear panel 66 is brought back over the file folder flap, pushed downward in the direction of the arrow 116, and placed against the front panel 64. In FIG. 11, it is seen that the lower edge 80 is tucked back between the file folder 36 and the front panel and released by the user to snap back against the folder (best seen in FIG. 11G).

Thus, the present computer diskette retainer provides the opportunity of retaining a computer diskette with a file folder in protected and secure relationship. The diskette holder may be easily moved from folder to folder, or when adhesive is provided, the retainer may alternately be permanently mounted to the folder. In addition, the present diskette retainer features an integral label retainer having the advantage of easily removing or replacing labels for the file and/or the diskette. Further advantages of the present diskette retainer are the locking detents which secure the diskette in the pocket against unwanted removal, and a stiffening formation to maintain the pocket in an open condition to facilitate the insertion and retrieval of diskettes from the pocket.

While a particular embodiment of the computer diskette retainer for file folders of the invention has been shown and described, it will be appreciated by those skilled in the art that changes and modifications may be made thereto without departing from the invention in its broader aspects and as set forth in the following claims.

What is claimed is:

1. A computer diskette retainer for accommodating and storing at least one computer diskette and being attachable to an upper edge of a file folder to be adjacent to the upper edge as the folder is disposed in a file drawer, said retainer comprising:

a pocket portion having a rear wall, a front wall, a pair of side walls and a bottom wall, said side walls and said bottom wall securing said front wall to said rear wall and maintaining said front wall in spaced relationship from said rear wall to define a pocket having an upper open end;

an attachment portion formed by an extension of said rear wall and having at least one laterally extending tongue for engaging the file folder;

each said tongue having a base integral with said attachment portion, a free end disposed proximate to a corresponding one of said side walls;

said attachment portion providing sufficient support to said pocket portion so that upon engagement of said at least one tongue with the file folder, said pocket portion is suspended from the upper edge of the file folder and accommodates the at least one diskette therein; and label retaining means for retaining a label therein, said label retaining means including a front panel and a rear panel joined along a common edge and defining a label retention area therebetween, a lower edge of one of said front and rear panels being integral with said attachment portion.

2. The computer diskette retainer as defined in claim 1 wherein said rear, front and side walls are self-supporting.

3. The computer diskette retainer as defined in claim 1 wherein each said tongue includes a lower edge in generally spaced, parallel relationship to an upper edge of said rear wall.

4. The computer diskette retainer as defined in claim 1 wherein said lower edge of said front panel is integral with said attachment portion, so that, upon engagement of said retainer upon the folder, said front panel exerts a compressive force against said rear panel with a label sandwiched therebetween.

5. The computer diskette retainer as defined in claim 1 further including stiffening means for maintaining said front wall in spaced relationship from said rear wall.

6. The computer diskette retainer as defined in claim 5 wherein said stiffening means includes a stiffening bead on at least one of said front and rear walls.

7. The computer diskette retainer as defined in claim 1 further including locking means for releasably locking the at least one diskette in said pocket portion.

8. The computer diskette retainer as defined in claim 7 wherein said locking means includes at least one detent projecting into said pocket from at least one of said front and rear walls for engaging a recess on the diskette.

9. The computer diskette retainer as defined in claim 1 wherein said attachment portion further includes an adhesive applied to a rear surface of said attachment portion for securing said retainer to the folder.

10. A computer diskette retainer for accommodating and storing at least one computer diskette and being attachable to an upper edge of a file folder to be adjacent the upper edge as the folder is disposed in a file drawer, the folder having at least one generally vertically oriented slot, said retainer comprising:

a pocket portion having a rear wall, a front wall, a pair of side walls and a bottom wall, said rear, front and side walls are self-supporting, said side walls and said bottom wall securing said front wall to said rear wall and maintaining said front wall in spaced relationship from said rear wall to define a pocket having an open upper end;

an attachment portion formed by a vertical extension of said rear wall and having a pair of laterally extending tongues for matingly engaging corresponding slots on the folder;

each said tongue having a base integral with said attachment portion, a free end disposed proximate to a corresponding one of said side walls, each said tongue including a lower edge in generally spaced, parallel relationship to an upper edge of said rear wall;

said attachment portion providing sufficient support to said pocket portion so that upon insertion of said at least one tongue into a corresponding slot, said pocket portion is suspended from the upper edge of the file folder and accommodates a diskette therein;

label retaining means for retaining a label therein, said label retaining means including a front panel and a rear panel joined along a common edge and defining a label retention area therebetween, said lower edge of said front panel is integral with said attachment portion, and front panel exerts a compressive force against said rear panel when said retainer is attached to the file folder.

11. The computer diskette retainer as defined in claim 10 further including stiffening means for maintaining said front wall in spaced relationship from said rear wall.

12. The computer diskette retainer as defined in claim 10 further including locking means for releasably locking the at least one diskette in said pocket portion.

13. A combination file folder and computer diskette retainer for accommodating and storing at least one computer diskette with file contents, comprising:

a file folder having a pair of elongate upper edges;

a computer diskette retainer including a pocket portion having a rear wall, a front wall, a pair of side walls and a bottom wall, said side walls and said bottom wall securing said front wall to said rear wall and maintaining said front wall in spaced relationship from said rear wall to define a pocket having an open upper end;

an attachment portion formed by an extension of said rear wall and having at least one laterally extending tongue for engaging said file folder;

each said tongue having a base integral with said attachment portion, a free end disposed proximate to a corresponding one of said side walls;

said attachment portion providing sufficient support to said pocket portion so that upon engagement of said at least one tongue with the file folder, said pocket portion is suspended from the upper edge of the file folder and accommodates at least one diskette therein; and wherein said file folder has at least one generally vertically oriented slot disposed along at least one of said upper edges, and said tongues are constructed and arranged to engage a corresponding one of said slots for suspending said diskette retainer adjacent said upper edge of said folder.

14. A computer diskette retainer for accommodating and storing at least one computer diskette, said diskette having at least one recess, said retainer being attachable to an upper edge of a file folder to be adjacent to the upper edge as the folder is disposed in a file drawer, said retainer comprising:

a pocket portion having a rear wall, a front wall, a pair of side walls and a bottom wall, said side walls and said bottom wall securing said front wall to said rear wall and maintaining said front wall in spaced relationship from said rear wall to define a pocket having an upper open end;

an attachment portion formed by an extension of said rear wall and having at least one laterally extending tongue for engaging the file folder;

each said tongue having a base integral with said attachment portion, a free end disposed proximate to a corresponding one of said side walls;

said attachment portion providing sufficient support to said pocket portion so that upon engagement of said at least one tongue with the file folder, said pocket portion is suspended from the upper edge of the file folder and accommodates the at least one diskette therein; and locking means for releasably locking the at least one diskette in said pocket portion, said locking means includes at least one detent projecting normally into said pocket from at least one of said front and rear walls for engaging a corresponding one of the at least one recess on the diskette.

* * * * *